(12) United States Patent
Jaw

(10) Patent No.: US 6,179,531 B1
(45) Date of Patent: Jan. 30, 2001

(54) PORTABLE MACHINE FOR PROCESSING KEYS

(76) Inventor: Joei Jaw, 4-6 Fl., No.22, Wuchauan 2nd Rd., Hsin-Chuang City, Taipei Hsien (TW)

(*) Notice: Under 35 U.S.C. 154(b), the term of this patent shall be extended for 0 days.

(21) Appl. No.: 09/405,169

(22) Filed: Sep. 24, 1999

(51) Int. Cl.[7] .................................................. B23C 3/35
(52) U.S. Cl. ............................................ 409/83; 76/110
(58) Field of Search ........................... 409/81, 82, 83; 76/110; 29/76.2

(56) References Cited

U.S. PATENT DOCUMENTS

| | | | |
|---|---|---|---|
| 1,978,009 | * 10/1934 | Caron .................................. | 409/82 |
| 3,358,561 | * 12/1967 | Roxburgh et al. .................. | 409/83 |
| 3,418,882 | * 12/1968 | Brand ................................... | 409/82 |
| 3,495,482 | * 2/1970 | Simon ................................... | 76/110 |
| 3,978,764 | * 9/1976 | Patriquin ............................. | 409/83 |
| 4,022,104 | * 5/1977 | Falk ..................................... | 409/81 |
| 4,051,748 | * 10/1977 | Sherman ............................. | 76/110 |
| 4,088,060 | * 5/1978 | Johns .................................. | 409/81 |
| 4,203,693 | * 5/1980 | Schwartz et al. .................. | 409/81 |
| 4,314,780 | * 2/1982 | Fish et al. .......................... | 409/81 |
| 4,969,782 | * 11/1990 | Castain .............................. | 409/81 |
| 5,441,369 | * 8/1995 | Foscan et al. .................... | 409/81 |
| 5,711,643 | * 1/1998 | Parr et al. ......................... | 409/83 |

FOREIGN PATENT DOCUMENTS

610619 * 6/1978 (SU) ..................................... 409/81

* cited by examiner

*Primary Examiner*—William Briggs
*Assistant Examiner*—Erica Ergenbright
(74) *Attorney, Agent, or Firm*—Bacon & Thomas, PLLC (57) ABSTRACT

A portable machine for processing keys, which uses computer-controlled sensors and servo motors to control the position of a bevel scale and the position of a cutting depth scale, so as to accurately control the feeding of a reamer in processing a blank into a key.

9 Claims, 8 Drawing Sheets

PORTABLE MACHINE FOR PROCESSING KEYS

BACKGROUND OF THE INVENTION

The present invention relates to a machine for processing keys, and more particularly to a portable machine for processing keys, which greatly shortens the processing time in making a key precisely.

Conventional machines for processing keys commonly use computer-controlled air cylinders to control the angle and stroke of the feeding of a reamer in processing a blank into a key. The air cylinders are controlled by a microprocessor, by means of the running of a computer program, to achieve eight different feeding strokes. Because a number of air cylinders and servomotors are used, conventional machines for processing keys are commonly bulky and heavy. Because air cylinders control the cutting angle and cutting depth of the reamer, it is difficult to achieve the desired cutting operation precisely. Further, because the air cylinders must achieve eight different feeding strokes, the design of the computer program is sophisticated.

SUMMARY OF THE INVENTION

The present invention uses a computer to control the operation of a set of sensors and motors, so as to further control the movement of a bevel scale and a cutting depth scale, enabling the feeding of the reamer to be accurately controlled. According to one aspect of the present invention, a cutting angle control unit and a cutting depth control unit control the cutting angle and cutting depth of the reamer, which are in turn controlled by a set of sensors. The cutting angle control unit uses a bevel scale to control the cutting angle of the reamer. The cutting depth control unit uses a cutting depth scale to control the cutting depth of the reamer. The bevel scale and the cutting depth scale each have a plurality of peripheral notches. Through the respective peripheral notches, the sensors respectively detect the amount of movement of the bevel scale and the cutting depth scale. According to another aspect of the present invention, respective motors through respective toothed shafts move the bevel scale and the cutting depth scale. According to still another aspect of the present invention, a jig is used with the bevel scale to hold a blank, enabling the blank to be accurately processed into a key.

DETAILED DESCRIPTION OF THE PREFERRED EMBODIMENT

Referring to FIGS. from 1 through 4, a portable key making machine in accordance with the present invention is generally comprised of a housing 10, a cutting angle control unit 20, a cutting depth control unit 30, a first transmission unit 40, a cutting metal-working unit 50, a second transmission unit 60, a micro-adjustment unit 70, and a photoelectric sensor unit 80.

The housing 10 is comprises a hollow base frame 12, an upright support plate 13 fixedly fastened to the top side wall of the hollow base frame 12 by locating blocks 132, and a cover shell 11 covered on the hollow base frame 12 over the upright support plate 13. The cover shell 11 comprises a control panel 111 at the front sidewall thereof, and two openings, namely, the first opening 112 and the second opening 113 through the front sidewall. The hollow base frame 12 comprises a plurality of through holes 121 through the topside wall thereof. The upright support plate 13 comprises a plurality of through holes 131 of different diameters.

The cutting angle control unit 20 is comprised of a blank holder 21, a C-shaped clamp 22, a bevel scale 23, a rotary member 25, a toothed ring 26, and a second C-shaped clamp 27 respectively fastened to one another in proper order, and installed in one through hole 131 at the upright support plate 13. The blank holder 21 comprises an axially extended through hole 211. The bevel scale 23 comprises a reference hole 231, and a plurality of peripheral notches 232. The rotary member 25 comprises a locating hole 251 for the positioning of a jig 24.

The cutting depth control unit 30 is comprised of a holder block 31, a first C-shaped clamp 32, a cutting depth scale 33, a rotary member 34, a toothed ring 35, and a second C-shaped clamp 36 respectively fastened to one another in proper order, and installed in one through hole 131 at the upright support plate 13. The holder block 31 comprises a screw hole 311. The cutting depth scale 33 comprises a reference hole 331, and a plurality of peripheral notches 332. The rotary member 34 comprises a plurality of screw holes 341.

The first transmission unit 40 comprises two motors, namely, a first motor 41 and a second motor 41' respectively mounted inside the hollow base frame 12 of the housing 10, two axle holders 42 and 42' respectively and fixedly fastened to the top side wall of the hollow base frame 12 around a respective through hole 121, and two toothed shafts, namely, the first toothed shaft 43 and the second toothed shaft 43' respectively coupled to the motors 41 and 41' and inserted through the axle holders 42 and 42'. The first toothed shaft 43 is meshed with the toothed ring 26 of the cutting angle control unit 20. The second toothed shaft 43' is meshed with the toothed ring 35 of the cutting depth control unit 30.

The cutting metal-working unit 50 comprises a movable motor mount 52 suspended above the hollow base frame 12 behind and in parallel to the upright support plate 13, the motor mount 52 comprising a center axle hole 522 on the middle, a clamping hole 521 at one end, and a mounting hole 523 at an opposite end, a motor 51 fixedly mounted on the back side wall of the upright motor mount 52, the motor 51 having a motor shaft 511 inserted through the axle hole 522 at the motor mount 52, an axle bearing 53 mounted in the center axle hole 522 to support the motor shaft 511 of the motor 51, a reamer holder 54 mounted on the motor shaft 511 of the motor 51, and a reamer 55 mounted on the reamer holder 54 in axial alignment with the axially extended through hole 211 at the blank holder 21 of the cutting angle control unit 20.

The second transmission unit 60 comprises an axle holder 61 fixedly mounted on the top side wall of the hollow base frame 12, an axle bearing 62 mounted in the axle holder 61, an axle 63 supported in the axle bearing 62 and inserted through the clamping hole 521 at the upright motor mount 52, the axle 63 having a guide hole 631 at one end thereof, a screw rod 64 having one end inserted into the guide hole 631 and an opposite end threaded into the screw hole 311 at the holder block 31 of the cutting depth control unit 30, and a spring 65 mounted around the screw rod 64 and supported between the upright support plate 13 and the mount 52.

The micro-adjustment unit 70 comprises a locating block 76 fixedly mounted on the top side wall of the hollow base frame 12, an axle holder 73 fixedly mounted on the mounting hole 523 at the motor mount 52, an axle bearing 74 mounted on the axle holder 73, an adjustment rod 72 supported in the locating block 76 and the axle bearing 74 at the axle holder 73 and inserted through one through hole 131 at the upright support plate 13, a knob 71 fixedly fastened to one end of the adjustment rod 72, and a compression spring 75 mounted around the adjustment rod 72.

The photoelectric sensor unit 80 comprises a plurality of sensors 81, 81' and 81" respectively mounted on the upright support plate 13 and the axle holder 61, and a transmitter element 82 mounted on the motor mount 52. The sensors 81 and 81' detect the position of the bevel scale 23 and the position of the cutting depth scale 33 respectively. The transmitter element 82 gives a signal to the sensor 81" upon an interruption of power supply, causing the sensor 81" to output a control signal to the second transmission unit 60 to reset the cutting metalworking unit 50.

Figure 1:
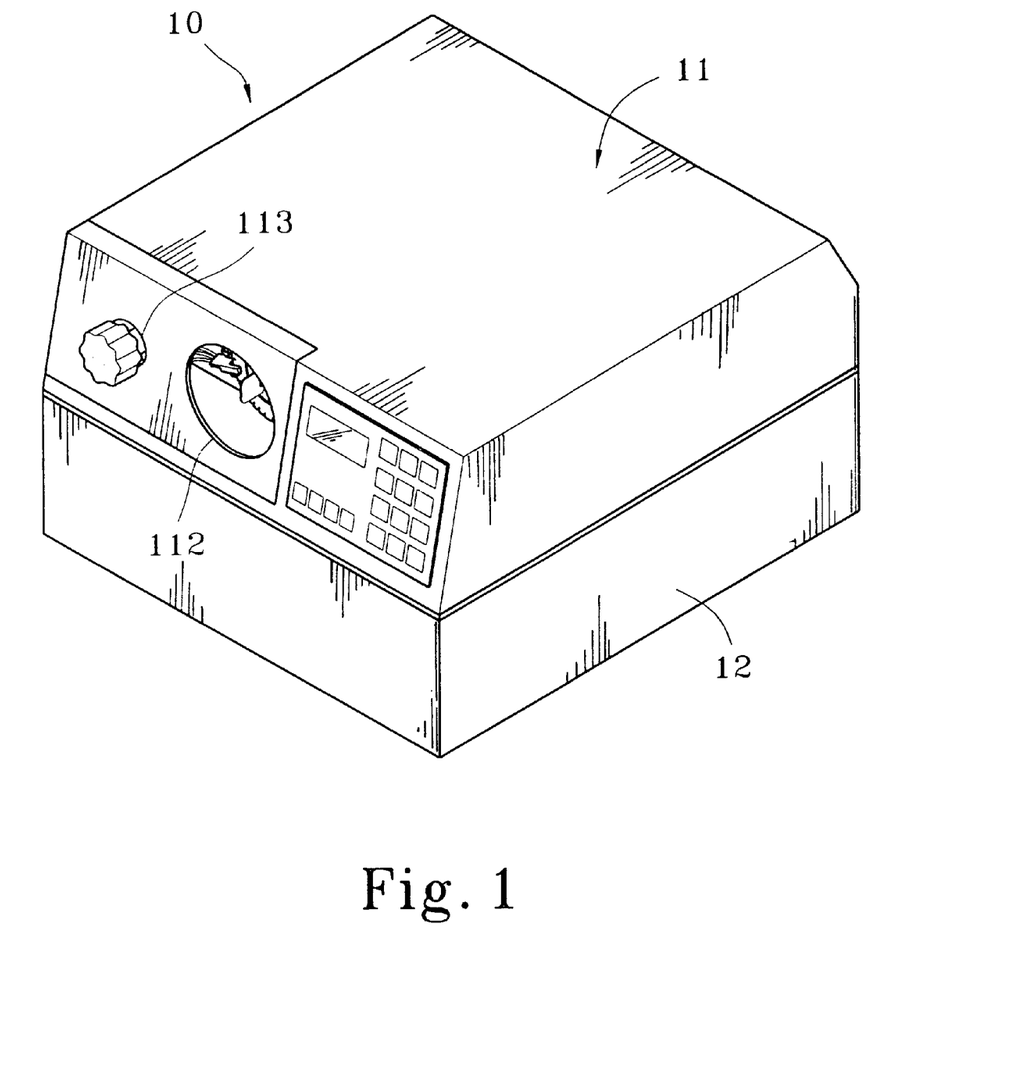
FIG. 1 is an elevational view of a portable machine for processing keys according to the present invention.
Figure 2:
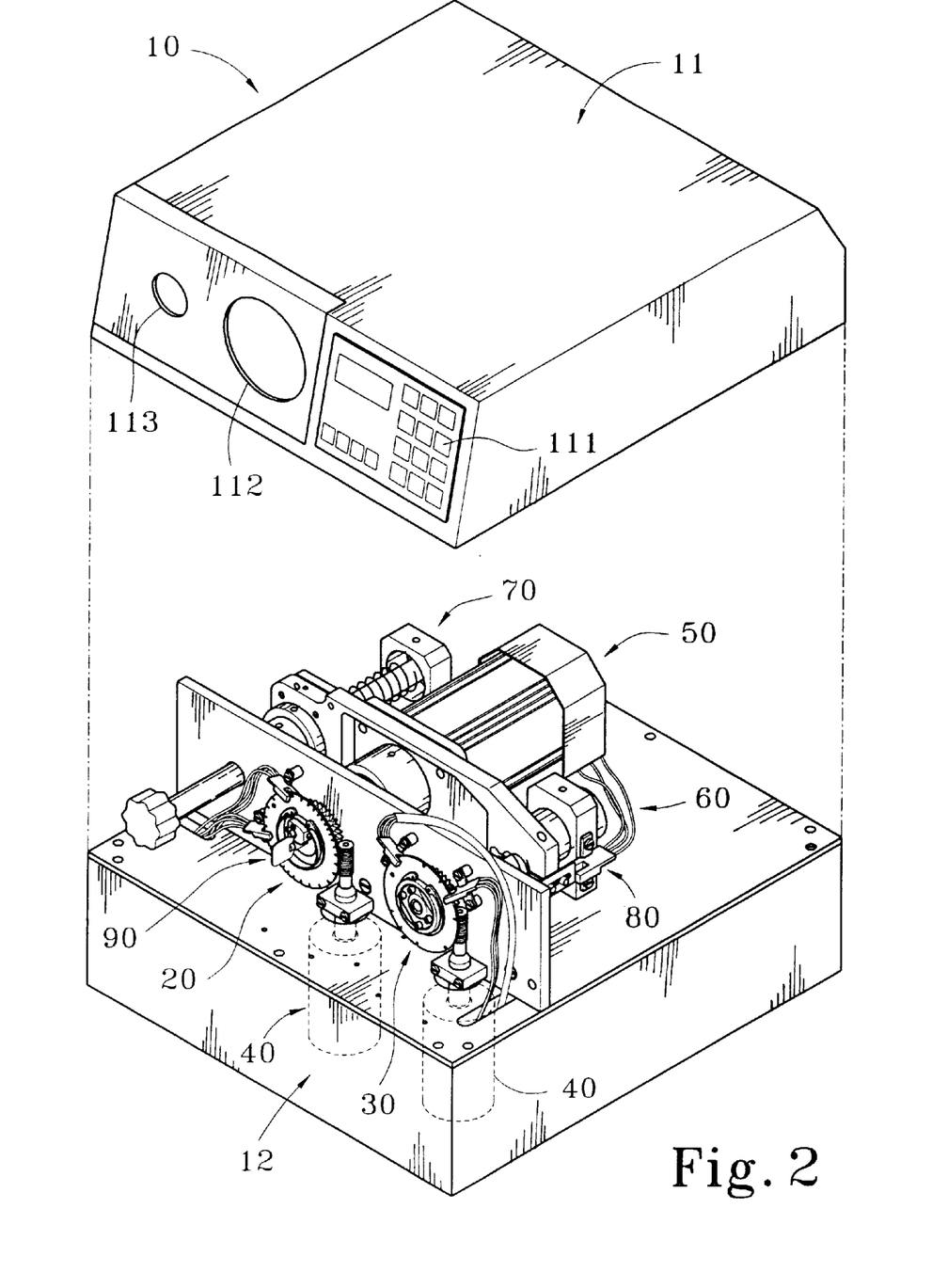
FIG. 2 is a perspective view of the portable machine shown in FIG. 1 (the cover shell opened from the hollow base frame).
Figure 3:
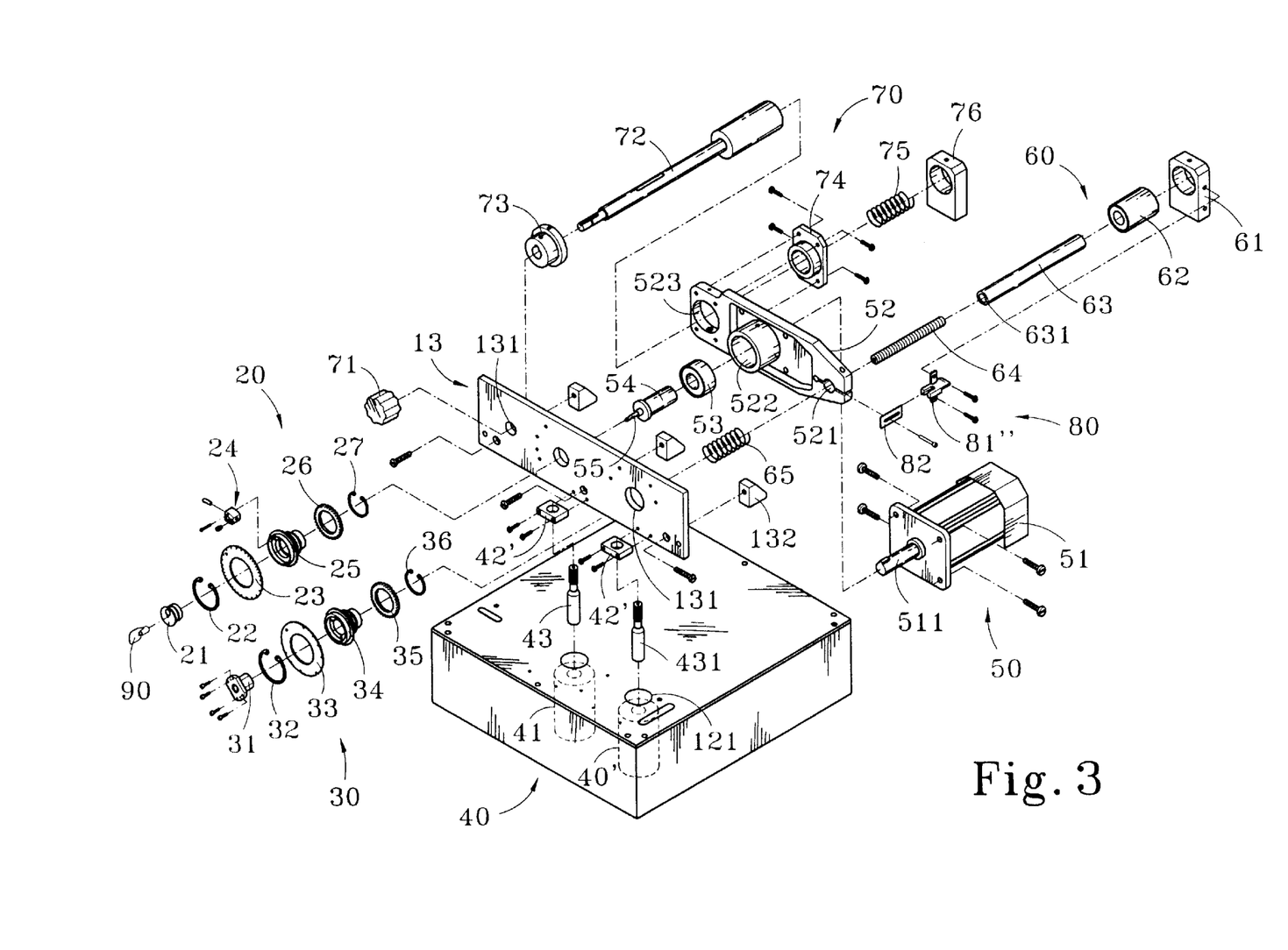
FIG. 3 is an exploded view of the portable machine shown in FIG. 1 (the cover shell excluded).
Figure 4:
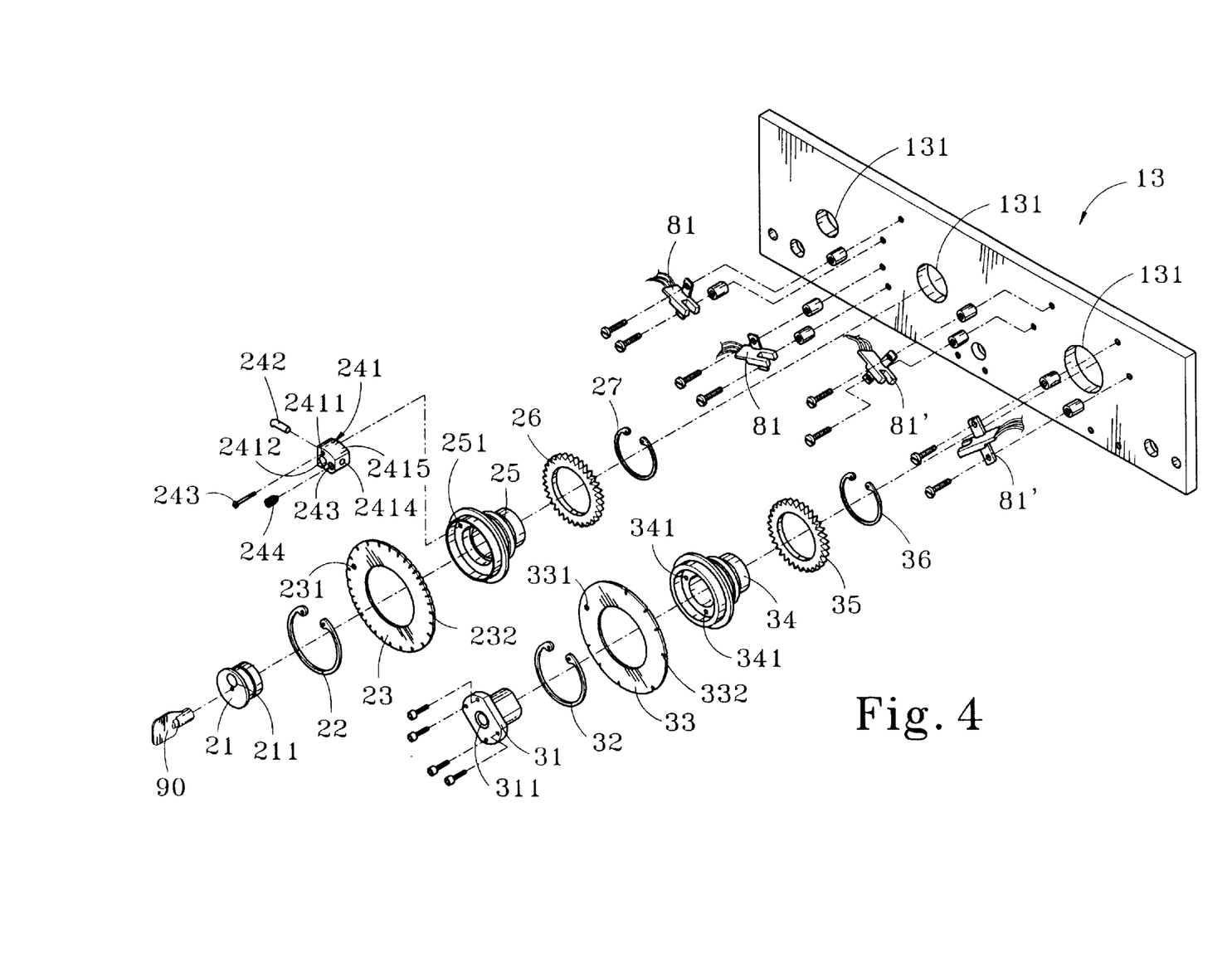
FIG. 4 is an enlarged view of a part of FIG. 3.
Figure 5:
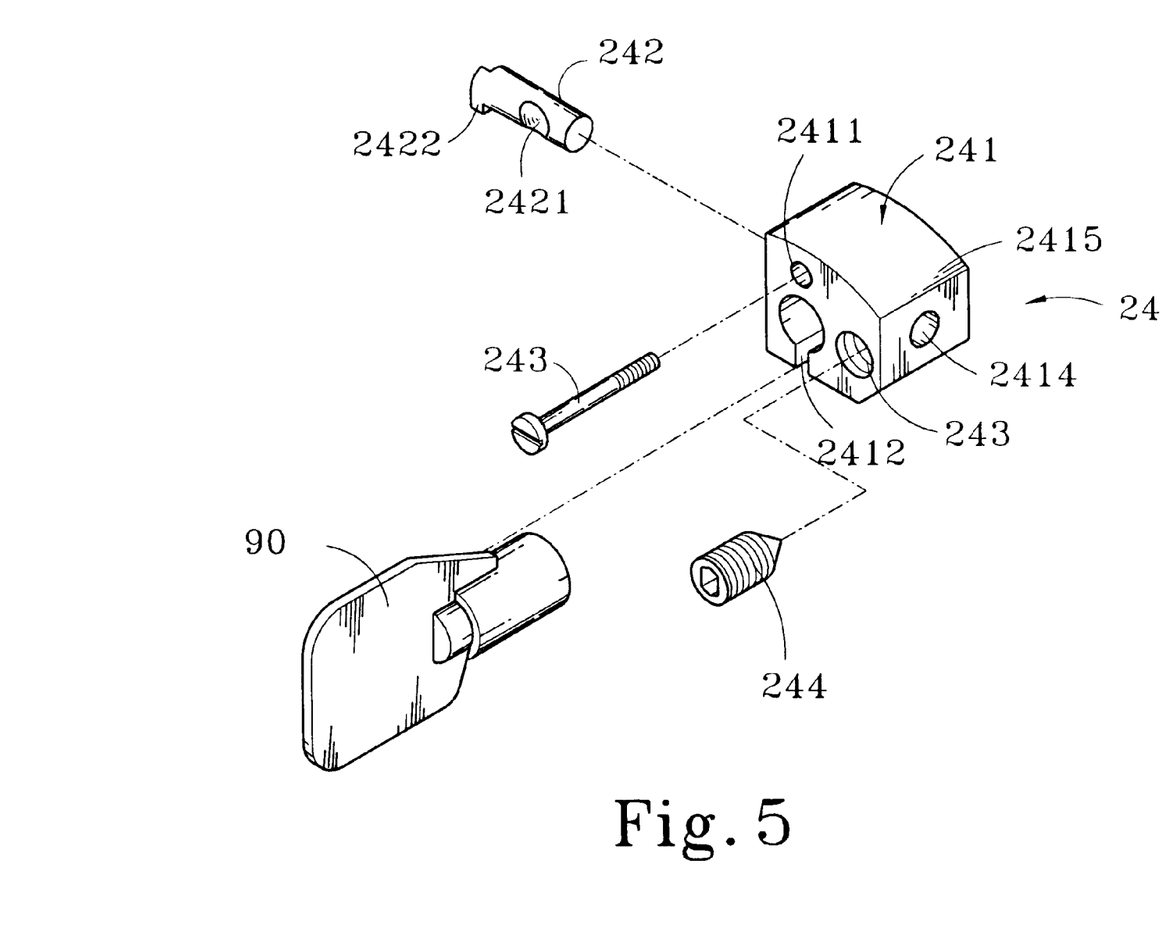
FIG. 5 is an exploded view of a jig for the portable machine shown in FIG. 1.
Figure 6:
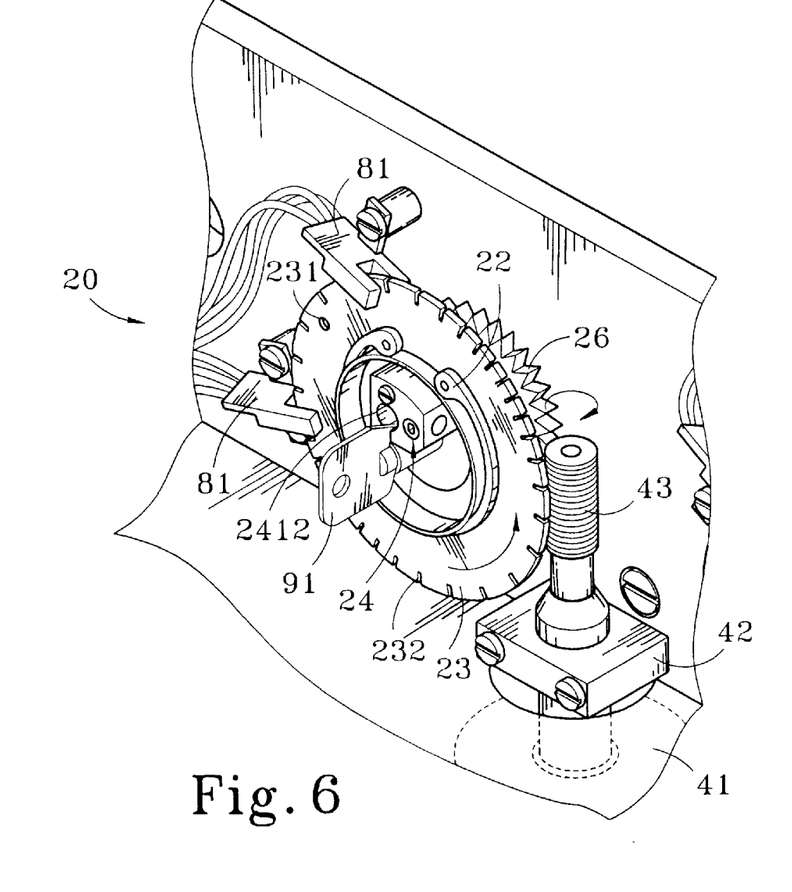
FIG. 6 is an enlarged view of a part of the present invention, showing the operation of the cutting angle control unit.

Referring to FIGS. 5 and 6, the jig 24 comprises a holder block 241, a holding down bolt 242, a tie screw 243, and a tightening up screw 244. The holder block 241 comprises a mounting hole 2411 fastened to the locating hole 251 at the rotary member 25 by the tie screw 243, a back coupling wall 2415 which is forced into engagement with the rotary member 25 after installation of the screw 243, a split clamping hole 2412 for holding the shank 91 of the blank 90 to be processed, a transverse through hole 2414 which receives the holding down bolt 242, and a screw hole 2413 perpendicularly extended from the transverse through hole 2414 to the front side wall thereof for receiving the tightening up screw 244. The holding down bolt 242 has a tapered recessed hole 2421 at the periphery, and a protruding press portion 2422 at one end thereof. When the tightening up screw 244 is fastened tight, the tapered front end of the tightening up screw 244 is engaged into the tapered recessed hole 2421 to move the holding down bolt 242 in the transverse through hole 2414 forwards, thereby causing the protruding press portion 2422 of the holding down blot 242 to be pressed on one side of the split clamping hole 2412, and therefore the shank 91 of the blank 90 is firmly secured to the clamping hole 2412. On the contrary, when the tightening up screw 244 is loosened, the holding down bolt 242 is released from the tightening up screw 244, and the split clamping hole 2412 is released from the pressure of the protruding press portion 2422 of the holding down bolt 242, enabling the blank 90 to be removed from the holder block 241.

Referring to FIG. 6, when starting the first motor 41 to rotate the first toothed shaft 43, the toothed ring 26 is driven by the first toothed shaft 43 to rotate the bevel scale 23, the rotary member 25, the jig 24 and the blank 90. The sensors 81 are respectively aimed at the reference hole 231 and the peripheral notches 232 of the bevel scale 23 to detect the direction and amount of rotary motion of the bevel scale 23, enabling the cutting angle control unit 20 to be accurately adjusted to the desired cutting angle.

Figure 7:
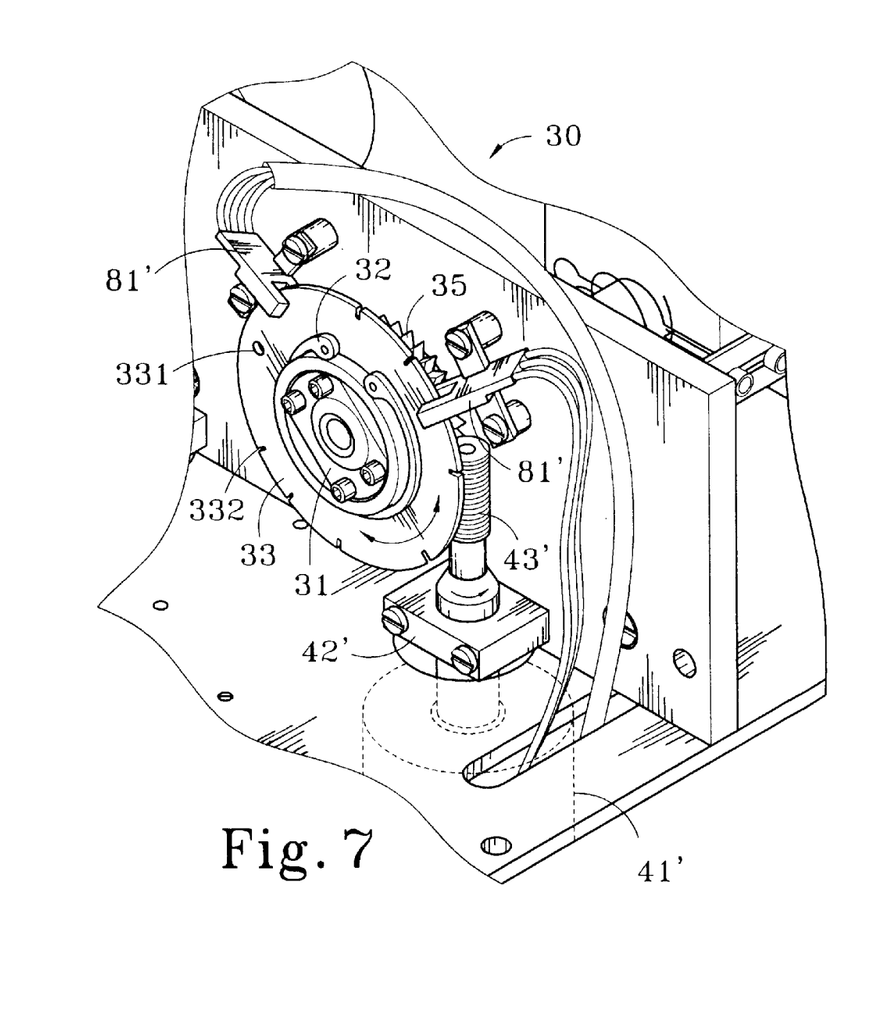
FIG. 7 is an enlarged view of a part of the present invention, showing the operation of the cutting depth control unit.

Referring to FIG. 7, when starting the second motor 41' to rotate the second toothed shaft 43', the toothed ring 35 is driven by the second toothed shaft 43' to rotate the cutting depth scale 33, the rotary member 34, the holder block 31 and the second transmission mechanism 60. The sensors 81' are respectively aimed at the reference hole 331 and the peripheral notches 332 of the cutting depth scale 33 to detect the direction and amount of rotary motion of the cutting depth scale 33, enabling the cutting depth control unit 30 to be accurately adjusted to the desired position.

Figure 8:
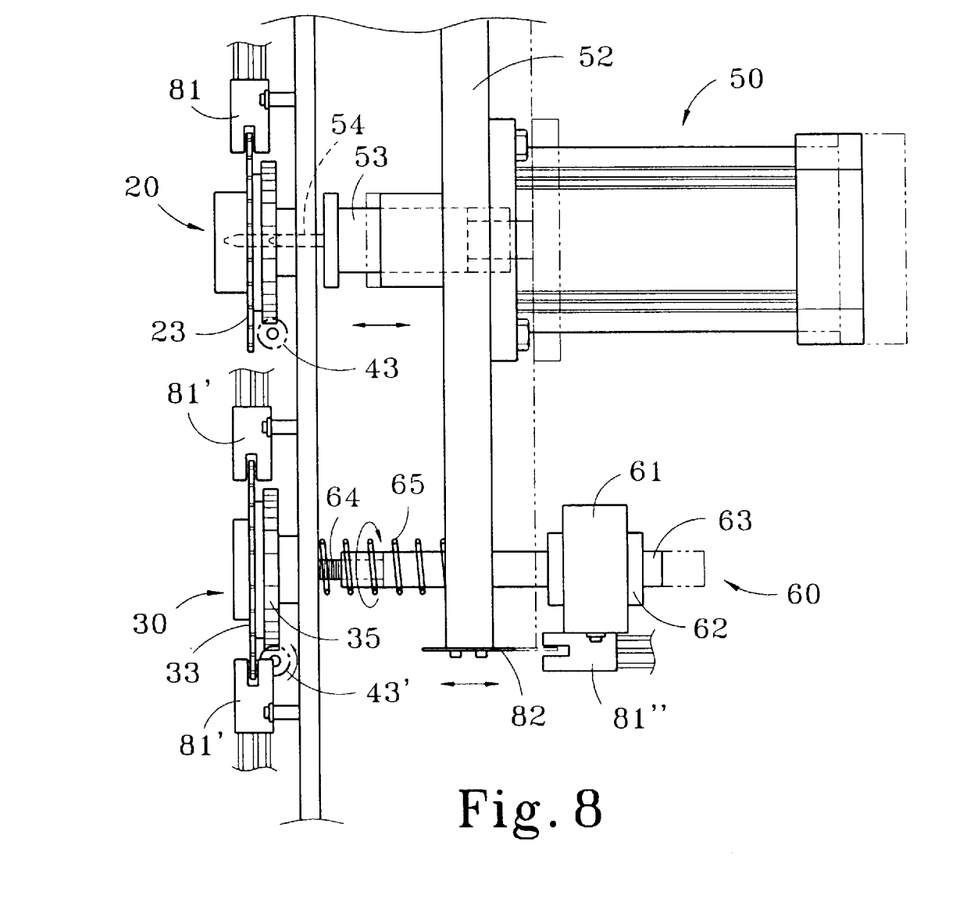
FIG. 8 is a schematic drawing showing the reamer feeding operation of the portable machine according to the present invention.

Referring to FIG. 8, the second toothed shaft 43' is driven by the second motor 41' to rotate the toothed ring 35, thereby causing cutting depth scale 33, the rotary member 34, the holder block 31 and the second transmission unit 60 to be rotated, and therefore the reamer 55 is moved with the reamer holder 54 and the motor mount 52 of the cutting metal working unit 50 backwards or forwards.

As indicated, the present invention uses computer controlled sensors and servomotors to control the position of the bevel scale and the position of the cutting depth scale, so as to further accurately control the feeding of the reamer.

While only one embodiment of the present invention has been shown and described, it will be understood that various modifications and changes could be made thereunto without departing from the spirit and scope of the invention disclosed.

What the invention claimed is:

1. A portable machine for processing keys, comprising:
a housing, said housing comprising a hollow base frame composed of interconnecting upright sides, a top, and a bottom, said base frame comprising a plurality of through holes through said top thereof, an upright support plate fixedly fastened to the top of said base frame, said upright support plate comprising a plurality of through holes of different diameters, said housing further comprising a cover shell having interconnecting upright sides and a top, which cover shell covers said hollow base frame over said upright support plate, said cover shell comprising a control panel at one of said side walls thereof, and a first opening and a second opening through the side wall having the control panel,
a cutting angle control unit, said cutting angle control unit comprised of a blank holder, a first C-shaped clamp, a bevel scale, a rotary member, a toothed ring, and a second C-shaped claim respectively fastened to one another in an order, and installed in one of said through holes at said upright support plate;
a cutting depth control unit, said cutting depth control unit comprised of a holder block having a threaded screw hole, a third C-shaped clamp, a cutting depth scale, a rotary member, a toothed ring, and a fourth C-shaped clamp respectively fastened to one another in an order, and installed in one of said through holes at said upright support plate;
a first transmission unit, said first transmission unit comprising a first motor and a second motor respectively mounted inside said hollow base frame of said housing, a first toothed shaft coupled to said first motor and meshed with the toothed ring of said cutting angle control unit, and a second toothed shaft coupled to said second motor and meshed with the toothed ring of said cutting depth control unit;

a cutting metal-working unit, said cutting metal-working unit comprising a movable upright motor mount suspended above said hollow base frame and disposed in parallel to said upright support plate, said motor mount comprising a center axle hole in a middle portion thereof, a clamping hole at one end thereof, and a mounting hole at an opposite end thereof, a motor fixedly mounted on said upright motor mount and having a motor shaft inserted through the axle hole at said motor mount, an axle bearing mounted in the center axle hole at said motor mount to support the motor shaft of the motor of said cutting metal-working unit, a reamer holder mounted on the motor shaft of the motor of said cutting metal-working unit, and a reamer mounted on said reamer holder;

a second transmission unit, said second transmission unit comprising an axle holder fixedly mounted on the top of said hollow base frame, an axle bearing mounted in the axle holder of said second transmission unit, an axle supported in the axle bearing of said second transmission unit and inserted through the clamping hole at said upright motor mount, said axle of said second transmission unit having a guide hole at one end thereof, a screw rod having one end inserted into the guide hole at said axle and an opposite end threaded into the screw hold at the holder block of said cutting depth control unit, and a compression spring mounted around said screw rod and supported between said upright support plate and said motor mount;

a micro-adjustment unit, said micro-adjustment unit comprising a locating block fixedly mounted on the top of said hollow base frame, an axle holder fixedly mounted on the mounting hole at said motor mount, an axle bearing mounted on the axle holder of said micro-adjustment unit, an adjustment rod supported in said locating block and the axle bearing at the axle holder of said micro-adjustment unit and inserted through one of said through holes at said upright support plate, and a knob fixedly fastened to one end of said adjustment rod; and a photoelectric sensor unit comprising a plurality of first sensors respectively mounted on said upright support plate to detect the position of said bevel scale and the position of said cutting depth scale respectively.

2. The portable machine of claim 1 wherein said bevel scale comprises a reference hole, and a plurality of peripheral notches.

3. The portable machine of claim 1 wherein said blank holder comprises an extended hole for holding a blank.

4. The portable machine of claim 1 wherein said cutting depth scale comprises a reference hole, and a plurality of peripheral notches.

5. The portable machine of claim 1 wherein said photoelectric sensor unit further comprises a second sensor mounted on the axle holder of said second transmission unit, and a transmitter element mounted on said motor mount, said transmitter element giving a signal to said second sensor upon an interruption of a power supply, causing said second sensor to output a control signal to said second transmission unit to reset said cutting metal-working unit.

6. The portable machine of claim 1 wherein the rotary member of said cutting angle control unit holds a jig for securing a blank to be processed, said jig is comprised of a holder block, a holding down bolt, a tie screw, and a tightening up screw.

7. The portable machine of claim 6 wherein the holder block of said jig comprises a mounting hole fastened to a locating hole at the rotary member of said cutting angle control unit by said tie screw, a split clamping hole for holding the blank to be processed, a through hole which is transverse with respect to a longitudinal axis of the clamping hole, which transverse through hole receives said holding down bolt, and a screw hole perpendicularly extended from said transverse through hole to an outside wall thereof for receiving said tightening up screw for enabling said tightening up screw to be rotated to move said holding down bolt in said transverse through hole to hold down the blank in said clamping hole.

8. The portable machine of claim 7 wherein said holding down bolt comprises a tapered recessed hole for receiving said tightening up screw, and a protruding press portion for pressing on one side of said split clamping hole.

9. The portable machine of claim 8 wherein said tightening up screw has a tapered front end for engaging into the tapered recessed hole at said holding down bolt to move said holding down bolt in said transverse through hole.

\* \* \* \* \*